United States Patent

Sampson et al.

[11] 3,930,094
[45] Dec. 30, 1975

[54] HYDROPHOBIC MATS FOR GAS DIFFUSION ELECTRODES

[75] Inventors: Ronald N. Sampson, Murrysville; Jacob Chottiner, McKeesport, both of Pa.

[73] Assignee: Westinghouse Electric Corporation, Pittsburgh, Pa.

[22] Filed: Nov. 9, 1973

[21] Appl. No.: 414,466

Related U.S. Application Data

[62] Division of Ser. No. 285,164, Aug. 31, 1972, Pat. No. 3,799,811.

[52] U.S. Cl. .......... 428/240; 136/120 FC; 136/144; 136/145; 264/49; 264/DIG. 8; 264/DIG. 47; 264/DIG. 81; 428/296; 428/303; 428/306; 428/308; 428/327
[51] Int. Cl.² ...................... B32B 5/16; H01M 4/06
[58] Field of Search ........... 161/47, 70, 71, 87, 109, 161/112, 158, 162, 165, 168, DIG. 6; 264/49, DIG. 8, DIG. 47, DIG. 81; 136/120 FC, 144, 145; 428/910, 240, 306, 327

[56] References Cited
UNITED STATES PATENTS

| | | | |
|---|---|---|---|
| 3,097,116 | 7/1963 | Moos | 136/120 FC |
| 3,536,796 | 10/1970 | Rock | 264/49 |
| 3,661,645 | 5/1972 | Strier | 264/49 X |
| 3,671,323 | 6/1972 | Sandler | 136/120 FC X |
| 3,733,221 | 5/1973 | Sandler et al. | 136/120 FC |
| 3,796,778 | 3/1974 | Gallacher | 264/49 |

FOREIGN PATENTS OR APPLICATIONS

| | | | |
|---|---|---|---|
| 1,044,503 | 10/1966 | United Kingdom | 264/49 UX |
| 1,044,502 | 10/1966 | United Kingdom | 264/49 UX |

Primary Examiner—George F. Lesmes
Assistant Examiner—Alan T. McDonald
Attorney, Agent, or Firm—D. P. Cillo

[57] ABSTRACT

A gas diffusion electrode having a gas entrance side and an electrolyte contacting side contains an electrical conductor and a hydrophobic outer layer on the gas entrance side, the hydrophobic outer layer comprising a mat containing fibrillated very high molecular weight polyethylene.

5 Claims, 4 Drawing Figures

U.S. Patent  Dec. 30, 1975  3,930,094 ated molecular weights of about 100,000–400,000 and melt flow indices of about 1–70, however, provides a melted low air permeable film at the processing temperatures encountered in air electrode manufacture. Should hydrophobic films prepared from conventional polyethylene polymers retain sufficient air permeability for use on an air electrode, they often are found to have reduced hydrophobicity as a result of required pressing at high temperatures in air electrode manufacture.

What is needed is an inexpensive hydrophobic membrane for gas diffusion electrodes, having the ability to retain hydrophobic and air permeability qualities after pressure and heat bonding to the active electrode layer in the electrode manufacturing process.

SUMMARY OF THE INVENTION

The above need is met by making an air permeable hydrophobic membrane mat, having a heat and compression resistant mat structure, from a blend of very high molecular weight polyethylene polymers, having a low melt flow index, and thermoplastic materials that are extractable from the blend by a solvent extraction process.

The preferred gas diffusion electrode comprises a catalytic layer contained within a porous electrical conductor plaque. The catalytic layer contains particles of electrically conductive material inert to the electrolyte, such as carbon, boron carbide, graphite, other carbonaceous materials inert to the electrolyte, or finely divided metals, and a resinous binder inert to the electrolyte, such as polytetrafluoroethylene. The catalytic layer includes a catalyst, such as platinum. The catalytic layer will contain sufficient binder to provide partial wet proofing. The high molecular weight polyethylene hydrophobic layer of this invention is rolled or hot pressed to one side of the partially wet proofed electrode. This results in a gas diffusion electrode providing improved periods of dry operation while retaining excellent air permeability.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENT

Figure 1:
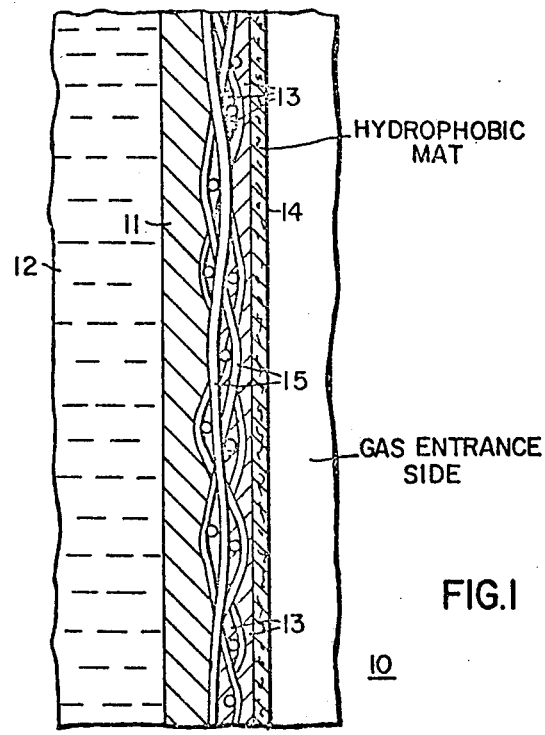
FIG. 1 is a schematic view through one embodiment of a gas diffusion electrode, showing the hydrophobic wet proof barrier layer.

FIG. 1 schematically illustrates an electrode 10, comprising a coherent porous body having a gas-entrance side and an electrolyte-contacting side, with three layers including an optional backing or supporting layer 11 next to electrolyte 12. The necessary layers include gas entrance catalytic layer 13 and gas permeable wet proof hydrophobic mat barrier layer 14. The layers 11

HYDROPHOBIC MATS FOR GAS DIFFUSION ELECTRODES

CROSS REFERENCE TO RELATED APPLICATIONS

The present application is a divisional application of application U.S. Ser. No. 285,164, filed on Aug. 31, 1972, now U.S. Pat. No. 3,799,811.

BACKGROUND OF THE INVENTION

This invention relates to hybrid metal-gas cell electrodes which have a new and improved hydrophobic layer comprising a mat containing fibrillated very high molecular weight polyethylene.

Fuel cells are electrochemical devices which convert the chemical energy in a fuel directly into electrical energy by the oxidation of fuel supplied to the cell. The fuel cell is composed of two gas diffusion electrodes adjacent to and in contact with an electrolyte, with means for supplying a fuel to one electrode and an oxidant to the other electrode. In a gas diffusion electrode, the gas penetrates by diffusion to a three-phase zone, which is a narrow electrochemically active zone where the gas, liquid electrolyte, and the solid particles of the electrode meet. A catalyst is usually used to accelerate the electrode reaction in gas electrodes. Ideally, the catalyst is most effective when it is located at the active interface where the electrolyte and gas meet in the presence of an electrical conductor. Preferably, that interface is close to the gas phase so that there is a short diffusion path for the gas.

A gas diffusion electrode is also used in hybrid batteries. In these, the diffusion electrode is fed with air or oxygen and is generally paired with a metal electrode. In operation, the chemical energy of oxidation of the fuel or of the metal is converted into electrical energy.

A common weakness of gas diffusion electrodes is the occurrence of "sweating" or "weeping", which is the formation of tiny drops of electrolyte on the gas side of the electrode due to penetration of the electrolyte. A variety of methods have been tried to attempt to avoid penetration of the electrode by the electrolyte.

The prior art has recognized and sought to alleviate the problem of electrolyte penetration through the electrode. Fluorocarbon polymers, used to prevent this penetration as binders to fill the electrode pores and as pure polymeric sheets in dual structure electrodes, are described in U.S. Pat. No. 3,385,780. Fluorinated polymer, coated on glass cloth substrates as a barrier sheet in liquid-liquid type fuel cells for the purpose of preventing liquid oxidant from reacting with catalyst in the electrode, are described in U.S. Pat. No. 3,382,103.

Fluorocarbon polymers in the forms employed within the air electrode and as a barrier sheet are very expensive and may cost as much as 3 to 15 dollars per pound. Also, high pressing temperatures, on the order of 190°C are required to bond these sheets to the active air electrode structure, and the sheets may lose as much as 80% of their original air permeability during this heat pressing step, which is generally required in air electrode manufacture.

The use of porous polyethylene films has been suggested as a hydrophobic membrane for fuel cell electrodes, by Moos in U.S. Pat. No. 3,097,116, in conjunction with a catalyzed synthetic zeolite ($Na_2O.Al_2O_3.(SiO_2)_2$ or $K_2O.Al_2O_3.(SiO_2)_2$) active layer. The use of conventional polyethylene polymers, i.e. those having and 13 are shown on opposite sides of a porous electrical conductor plaque or grid 15.

The catalytic layer 13 can be composed of particles of a carbonaceous material selected from the group consisting of carbon, graphite, boron carbide, and mixtures thereof. When carbon is used as the conducting material, the particles have a surface area of from about 5 to 1000 square meters per gram. In addition, the layer 13 includes a binder inert to the electrolyte, for example, polymers and copolymers of polysulfone resin, polyethylene resin, polypropylene resin, or a fluorocarbon or chloro-fluorinated hydrocarbon polymer, that binds the particles of conducting material together in a porous manner. The amount of binder may vary from about 10 to 50 weight percent of the total composition of layer 13, with a preferred range of from about 20 to 50 weight percent.

In addition, layer 13 includes a suitable catalyst which would contain at least one of the metals of a group consisting of the platinum group metals (Pt, Ir, Ru, Rh, Pd), mercury, gold and silver. Other catalysts may be used. Their choice depends on the reaction proceeding at the electrode. Thus for the oxygen electrode, members of the transition elements or mixtures thereof, or silver, gold or their mixtures with oxides, nitrates, etc. are examples of efficient catalysts. The catalytic material is generally added to give active catalyst in an amount varying from about 0.1 to 10 milligrams per sq. cm. of geometric electrode area.

The optional supporting layer 11, when used, is composed of particles of a carbonaceous material and binder similar to that used in layer 13, but the amount of binder may vary from about 5 to 50 weight percent of the total composition of the layer. The supporting layer although adding strength to the structure may be eliminated if space considerations are important, or if the electrode structure is strong enough to eliminate its need, as when bonded fibrous metal wool members are used as the electrical conductor 15. A typical thickness of the electrode may vary from about 20-65 mils.

The porous metal electrical conductor 15 may be a wire mesh member, an expanded metal member, a perforated metal sheet, or preferably, a fibrous metal wool member that is diffusion bonded at points of fiber contact. The conductor is generally composed of nickel, steel or iron that may be plated with a noble metal when used as an air electrode. When iron or steel wool is used as the electrical conductor it can be coated with nickel and will provide a conductor having a bonded matrix of fibers 15 about 0.01–0.04 inch thick, into which the material constituting the catalyzed layer 13 can be intruded by a wet pasting or other technique.

Figure 2:
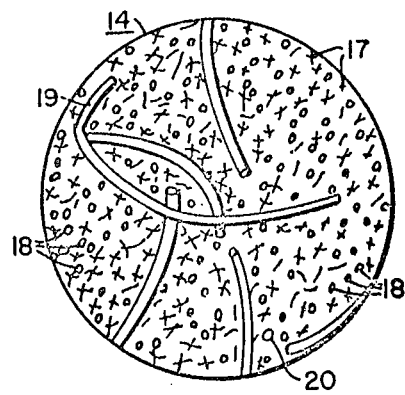
FIG. 2 is an enlarged view of the surface of the hydrophobic membrane mat of this invention, showing the fibrillated, very high molecular weight polyethylene strands, the irregular shaped high molecular weight polyethylene particles and the optional interlocking reinforcement filler material.

The gas permeable hydrophobic barrier layer membrane mat 14 is shown in an enlarged view in FIG. 2. The mat comprises fibrillated strands 17 of very high molecular weight polyethylene, which are interlocked and pressed together along with irregular shaped particles 18 of very high molecular weight polyethylene. The fibrillated component 17, will constitute at least 15 percent, and preferably about 35 to 85 percent of the total strands, and irregular shaped particles making up the mat i.e. no. of strands/(no. of strands + no. of particles). These strands and particles are in a mat rather than film form and are not melted together. The strands are between about 0.5 to 4000 microns long and about 0.005 to 40 microns in diameter. The particles are between about 0.05 to 400 microns in diameter. The high molecular weight polyethylene strands and particles provide a very tough, resilient, heat resistant, interlocked mat, having about 20–50% porosity and a pore size, shown as 20, the diameter circle that can be inscribed between strands and particles, ranging from about 0.003 to about 100 microns in diameter, with an average pore size of about 20 microns.

To provide additional strength for the barrier layer mat 14, large, interlocking filler material fibers 19 can be uniformly distributed through the mat. The reinforcement, when used, should be of a relatively non-wettable thermoplastic material such as, for example, fluorocarbon, polyamide, polyester, polypropylene or polyethylene fibers, about 0.01 to 2 inches long, preferably about 0.06–2 inches long, and about 0.0005–0.05 inches in diameter.

The polyethylene polymer is essentially a long chain aliphatic hydrocarbon of the type

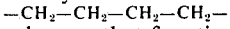
$$-CH_2-CH_2-CH_2-CH_2-$$

The polymers that function as the useful hydrophobic air permeable membrane mat, for the electrode for this invention, are very high molecular weight polyethylene polymers, having a weight-average molecular weight ($M_w$) over 1,750,000 and up to about 5,000,000 and a melt flow index (grams of a thermoplastic which can be forced through a 0.0825 inch orifice at 5000 grams force in 10 minutes at 250°C) up to about 0.02. These polymers are made of very long, nearly branch free chains and have a density of about 0.94–0.96 gm./cu. cm. The polymer may be made, for example, by coordination polymerization with Ziegler catalysts, as described in Brydson, *Plastics Materials* (1966), Chapter 7. This type polymer produces tough, resilient strands when sheared in particulate form, which enable the membrane mat to resist melt flow when the membrane is laminated to the electrode body.

In the method of this invention an air permeable hydrophobic mat, suitable for use as a barrier layer on an air electrode is made by (1) mixing: about 4 to 35 weight percent high molecular weight polyethylene powder or particles, having a weight average molecular weight of over 1,750,000 and a melt flow index of up to about 0.02; about 40 to 80 weight percent of at least one solvent-extractable highly viscous thermoplastic polymer such as, for example, polycarbonate polymer, polymethylmethacrylate polymer, polystyrene polymer, polyethylene oxide polymer, and the like with polymethylmethacrylate and polystyrene preferred; about 0 to 40 weight percent but, preferably about 15 to 40 weight percent, of a solvent extractable plasticizer, effective to improve the flow and extrusion properties of the mixture, for example, phthalates, such as dioctylphtalate, and dicyclohexylphthalate, dibenzoates and adipates that are compatible with the solvent-extractable polymer; about 0 to 10 weight percent of substantially non-water-wettable thermoplastic reinforcement fibers; and about 0 to 5 weight percent fluorocarbon particles such as polytetrafluoroethylene; the weight percent referring to the total blend after complete mixing, (2) fibrillating at least about 15 percent of the high density, very high molecular weight polyethylene, (3) forming a sheet from the blend and (4) extracting the solvent-extractable polymer and plasticizer from the sheet with a suitable solvent for a time effective to dissolve the extractable polymer and plasticizer but not the high density polyethylene and thermoplastic supporting fibers constituting the mat, to provide an air permeable, hydrophobic mat comprising fibrillated, interlocked, high density, high molecular weight polyethylene.

More specifically, high density, very high molecular weight polyethylene particles, having an average particle size up to about 400 microns in diameter, are dry blended at about 25°C with a solvent extractable polymer and preferably, a solvent extractable plasticizer that is thermally stable at the processing temperature and compatible with the solvent extractable polymer. Suitable plasticizers for the solvent extractable polymers disclosed are known to those in the art, described in the Plasticizers Chart in 1968 *Modern Plastics Encyclopedia*, pp. 460-472, and generally include phthalic acid derivatives, benzoic acid derivatives, and adipic acid derivatives. After about 30 minutes this mixture is placed onto a hot two roll mill, having rollers rotating toward each other and spaced generally between about 0.005-0.1 inch apart, depending on the batch size. The mill is operated at a temperature between about 85°-225°C, preferably 85°-135°C, and is effective to soften or melt the solvent extractable polymer and shear-fibrillate the high molecular weight polyethylene particles i.e. the particles are deformed by the stresses into a long, thin strand or fiber shape. The mixture, is worked into a soft, viscous, rubbery composition that is distributed between the two rolls.

After about 2 minutes, thermoplastic reinforcement fibers and/or an aqueous dispersion of polytetrafluoroethylene particles, preferably having an average particle size of about 0.05-10 microns in diameter, may optionally be added to the admixture in the hot roll mill.

After about 8-16 minutes on the hot roll mill or other suitable mixing means, which can act to heat-mix and shear-fibrillate, the blend in sheet form is removed and cooled. Preferably, the blend layers on the rolls in the hot roll mill repeatedly cut from the rolls as a sheet and then fed back between the rolls as a different angle.

The blend, may then optionally be broken into particulate form, generally in a hammer mill and may then be placed in a heated screw or plunger type extruder, and forced through a die to further shear-fibrillate the particles in the blend. Preferably, a flat tape die between about 0.01-0.02 inches is used. This step while providing a stronger membrane mat is optional.

The sheet is then placed in a molding frame and molded in a press for about 2-10 minutes at about 125°-180°C and 300-2000 psi., and then cooled to 40°-50°C under pressure to form a sheet about 0.02-0.06 inches thick.

The solvent extractable polymer and plasticizer are then extracted from the sheet to form an air permeable hydrophobic mat. Preferably the sheet is placed between bronze screens and immersed in a stirred bath of solvent which is effective to dissolve the extractable components in the sheet but will not appreciably attack or dissolve the other components making up the membrane mat. Examples of some suitable extracting agents are acetone, toluene, methylene chloride, methyl ethyl ketone, cyclohexanone, and diacetone alcohol among others. Naturally, a solvent will not be used which will harm the interlocking polyethylene or the support fibers of the mat. Preferably, the sheet is placed in an acetone bath for about 16 hours and then placed in a fresh acetone bath for about 2-3 hours, after which it is placed in a deionized water bath and then removed and dried. The mat at this point will be between about 0.010-0.045 inches thick, about 20-50% porous, and comprise unmelted, pressed, interlocked, fibrillated strands and irregular shaped particles of high density, very high molecular weight polyethylene, with uniformly scattered thermoplastic reinforcement fibers and fibrillated fluorocarbon particles if such were added to the admixture.

In this process it is essential that the high density, very high molecular weight polyethylene, which is initially mixed with the other components have an average particle size no greater than about 400 microns, or it will be difficult through shearing forces to achieve the 15-85 percent fibrillation desired. If temperatures much over 255°C are used in the mixing and fibrillation step the system will generally be too fluid, shear forces will be reduced and it will be difficult to achieve the degree of fibrillation desired. The fibrillation is desired, so that the mat will have a fibrous, paper-like structure after the extraction step. A structure comprising pressed, interlocked, fibrillated strands is advantageous in providing an open structure which will act in a resilient fashion during hot bonding to the active electrode body, so as to retain its air permeability qualities.

The mat is then bonded onto the gas diffusion electrode, which is preferably a fiber metal matrix with an intruded catalytic layer, to form an air permeable, hydrophobic composite. This bonding step is carried out at about 90°-200°C, preferably by placing the mat on the catalyzed layer and passing the mat and electrode through heated laminating rolls, at between about 170-375 lb./lineal inch of electrode which heat-press the mat onto the electrode without melting the high density, very high molecular weight polyethylene in the mat. In this process it is essential that the high density polyethylene have a weight average molecular weight over 1,750,000 and a melt flow index below about 0.02, so that the strands and irregular particles comprising the mat will not flow and compact into a low porosity melted film or sheet during heat bonding to the gas diffusion electrode.

By using a fibrillated structure and high density, very high molecular weight, low flow polyethylene, the air permeability of the mat, after heat-pressing the mat to the electrode, is only reduced between about 30-60%, versus about 80% reduction in permeability for pure Teflon membranes, and essentially 100% for conventional polyethylene sheets ($M_w$ = 100,000-500,000 and melt flow index = 1-70). The conventional polyethylene sheets generally weld into a non-porous form at temperatures and pressures required to bond the barrier layer to the electrode structure.

Figure 3:
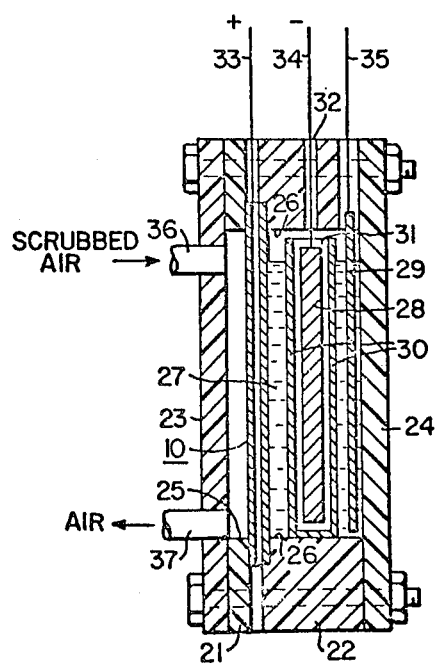
FIG. 3 is a schematic view showing a gas diffusion electrode mounted in hybrid battery.

In actual use as an air electrode in a metal-air battery, the electrode 10 may be employed as shown in FIG. 3. For that purpose the electrode 10 is mounted between a pair of frame members 21 and 22 which are disposed between end plates 23 and 24. An air chamber 25 is provided between the end plate 23 and the electrode 10. Likewise, a chamber 26 is provided between the electrode 10 and the end plate 24, which chamber is filled with electrolyte 27 such as a 25-30 weight percent solution of NaOH or KOH. An electrode 28 and a charging electrode 29 (for recharging the battery) are disposed in the chamber 26 and within the electrolyte. The electrode 28 is composed of an oxidizable metal such as iron, cadmium or zinc. The charging electrode 29 is composed of an inert metal such as nickel. The electrode 28 is encased in an envelope 30 having an open top 31. The envelope 30 serves as a separator consisting of a sheet of cellophane sandwiched between sheets of fibrous polypropylene. The oxygen electrode is positive with respect to the metal electrode. When charging, the charging electrode is positive with respect to the metal electrode. A vent 32 in the frame member 22 is provided to permit the escape of gases from the electrodes 28 and 29 when charging. Wire leads 33, 34 and 35 extend from the electrodes 10, 28 and 29, respectively. An air inlet 36 and an air outlet 37 are provided in the end plate 23.

Figure 4:
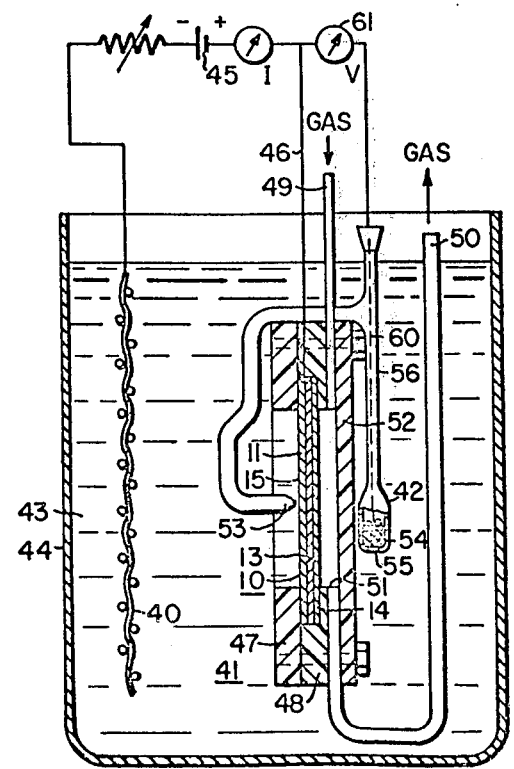
FIG. 4 shows an electrode testing device.

The electrode 10 was tested against an inert counter-electrode 40 in a driven circuit, such as shown in FIG. 4, for which purpose it was placed in an electrode holder 41, in conjunction with a reference electrode 42. As shown in FIG. 4 the assembly of the electrode holder 41 and the electrode 10 is immersed in an electrolyte 43, such as aqueous KOH, contained in a container 44. A counter electrode 40, composed of a metal mesh such as platinum or nickel, is likewise immersed in the electrolyte 43. The cell including the electrodes 10 and 40 in the electrolyte 43 is driven by a 12 volt battery 45 for testing with the electrode 10 connected to the circuit by a lead wire 46, which extends between the interfaces of the frame member 47 and the portions 48, and which is connected to the upper end of the grid conductor 15. The electrode holder 41 is provided with an inlet tube 49 and an outlet tube 40 which communicates with the portion of the opening 51 between the plate portion 52 and the electrode 10, whereby the active gas such as oxygen is in contact with the catalyzed gas entrance layer 13 and the barrier sheet layer 14.

The reference electrode 42 is used in conjunction with a Luggin capillary having an opening 53 which is located two mm. from the surface of the electrode 10, in order to measure the potential of the electrode against a point in the electrolyte located as closely as possible to the electrode 10. The electrode 42 includes a mercury/mercury oxide mixture 54 located in a glass bulb 55 that communicates via an inverted U-shaped glass tube 56 with the Luggin capillary opening 53 on the electrolyte side of the electrode 10. The tube 56 is filled with electrolyte 43. The tube 56 is U-shaped to facilitate attachment of the electrode 42 and the electrode holder 41. A platinum wire 60 leads from the Hg/HgO mixture 54 to one side of a high impedance voltmeter 61, the other side of which is connected to the electrode 10. When air is used as an active gas and the electrolyte is alkaline (KOH), the air before entering the device may be scrubbed by passing it through an alkaline solid absorbent or an alkaline solution.

EXAMPLE 1

Mats comprising fibrillated very high molecular weight polyethylene were made by the following procedure. A mixture of 40 grams (10 wt.%) of very high molecular weight polyethylene powder, having an average particle size of between about 100–300 microns ( −50 mesh size — U.S. Screen No.), a crystalline melting point of 130°–131°C, a water absorption factor (ASTM designation D570) of 0.03%, a density at 20°C of 0.940–0.942gm/cu. cm., a weight average molecular weight of about 2,000,000 ($M_w$) and a melt flow index (ASTM designation D1238) of nil i.e., about 0.01 gr./10 min. (sold commercially by Hercules Powder Co. under the Tradename Hi-Fax 1901 Shock and Abrasion Resistant Polyethylene); 320 grams (80 wt.%) of polymethylmethacrylate beads, having an average particle size of about 400 microns; and 32 grams (8 wt.% of the total blend) of separated, fibrous polytetrafluoroethylene filler, 0.016 inch long floc, was placed in a Patterson-Kelley twin shell dry blender and mixed for 45 minutes at room temperature.

This mixture was then added to a Farrel two-roll mill (6 inches dia. rolls by 13 inches long, about 0.04 inches apart maintained at a temperature of 180°C). The mixture milled for 2 minutes to obtain a viscous batch on the rolls, then 7 grams (2 wt.%) of polytetrafluoroethylene particles, about 0.05 microns particle size on a 60% solids aqueous dispersion (sold by DuPont under the Tradename Teflon 30 B Emulsion) was added to the batch and the milling was continued for 5 minutes at a roll speed of about 35 ft./min., to flash off the water and form a viscous, rubbery blend.

The batch was cut from the rolls, in sheet form, rotated 90° and fed back into the nip between the hot rolls. The batch was milled again for 5 minutes at about 35 ft./min. and 180°C and then cut from the rolls in the form of a relatively stiff sheet about 0.04 inches thick. This dry mixing and hot roll milling operation mixes the components of the blend and fibrillates the polyethylene and polytetrafluoroethylene particles by the shear forces exerted by the hot rolls. If the rolls are maintained at a temperature much over about 225°C, the blend becomes too fluid and the shear forces and fibrillation are reduced. If the high molecular weight polyethylene powder has an average particle size over about 400 microns, it will be difficult to convert to the thin fibrillated strands desired for good interlocking in the final mat. The use of a suitable, extractable plastizer would effectively modify the milling and extrusion properties of the blend, provide a more flexible sheet off the hot rolls and allow use of lower temperatures in the hot milling-fibrillating step.

The sheet of blended material was then cooled and placed in a Wylie hammer mill to grind up the sheet and provide a particulate blend having an average particle size of about 0.07 inches (10 mesh size). The ground blend was then divided into two portions, Sample A and Sample B.

Sample A was placed in a Wayne extruder and extruded through a 0.010 inch flat tape die, to further fibrillate the components of the blend. The extruded tape was then cooled and reground in a Wylie hammer mill, as described above, to provide about 10 mesh average size particles.

Sample A and Sample B were then placed in a stainless steel molding frame about 6 × 6 × 0.050 inch, and heat-pressed at 170°C, and 1500 psi. for about 10 minutes in a Elmes Hydrocure flat-bed molding press. Each molded sheet was cooled to less than 50°C under pressure in the press before being removed.

The Sample A and Sample B sheets were placed between bronze screens and immersed in acetone for about 16 hours to extract the solvent extractable polymethyl methacrylate from the sheet. The sheets were then immersed in a fresh stirred acetone bath for another 4 hours, removed, rinsed in deionized water and dried. The acetone did not harm the polyethylene fibers and particles or the fluorocarbon filler fibers.

The Samples both had good integrity and flexibility and were both in substantially non-wettable mat form. Under 150X magnification they were seen to comprise pressed, interlocked thin strands forming the matrix of the mat and irregular shaped particles dispersed uniformly through the mat with longer interlocking supporting fibers uniformly dispersed through the matrix. Porosity for both Samples was between about 25–50% and the pore size was about 0.003 – 100 microns in diameter between the fibers and particles. Sample A was stronger than Sample B and appeared to have more fibrillated strands, a ratio of about three strands to seven particles (about 30% fibrillation i.e. 3/10) as compared to Sample B, about two strands to eight particles (about 20% fibrillation), due primarily to the extrusion of the Sample A blend. Both samples had a paper-like, rather than smooth finish and looked porous when held up to the light.

Sample A and B mats were tested for air permeability by testing 3.25 × 2.75 inch pieces. The air permeability apparatus consisted of a frame into which the mat was clamped, a flowmeter to measure the air flow rate, a nanometer for measuring the pressure differential across the cut mats and a vacuum source. The cut mats were placed in the metal clamp frame and checked for air tightness by sealing off the air intake part of the frame. The intake part was opened and the pressure differential across the cut mat pieces adjusted to 6 inches of water by throttling the vacuum. The air flow as measured by the flowmeter was then recorded. The results were as follows:

| Sample | Thickness (mils) | Density (gm./mil) | Air Permeability (cu. cm./min.) |
| --- | --- | --- | --- |
| A (extruded) | 34 | 0.077 | 375 |
| B | 32 | 0.083 | 370 |

Sample A and B mats were then heat-pressed by passing them through hot rolls at 190°C and 200–350 lb./lineal inch to simulate the conditions required in bonding hydrophobic barrier layers to form a composite gas diffusion electrode. The mats were then retested for air permeability:

| Sample | Thickness (mils) | Density (gm./mil) | Air Permeability (cu. cm./min.) |
| --- | --- | --- | --- |
| A (extruded) | 29 | 0.090 | 225 |
| B | 25 | 0.107 | 160 |

Drops of water were then placed on the mats and the water did not seep through. The net loss of air permeability for the unextruded fibrillated mat was 57% whereas the net loss for the extruded highly fibrillated mat was only 40%. The highly fibrillated mat provides a highly interlocked matrix of fine, tough strands which function in a highly resilient spring-like fashion upon compression, so as to retain high air permeability properties. The fibers and particles in the mats were pressed rather than melted together and after compression there appeared to be no melting or flow, the structure maintaining its porosity. This method provided a non-wettable, porous, air permeable barrier layer membrane made from polyethylene costing about 50 cents per pound, thus providing a distinct cost advantage over polytetrafluoroethylene membranes.

EXAMPLE 2

In this EXAMPLE, two films, one made from polytetrafluoroethylene, Sample C, and one made from regular low molecular weight polyethylene, Sample D, were made for comparative purposes. In the case of Sample C, the blend comprises about 10 wt.% of polytetrafluoroethylene particles having an average particle size of between about 0.05–0.5 microns about 50 wt.% of polymethylmethacrylate thermoplastic and about 40 wt.% of dicyclohexylphthalate solvent extractable plasticizer. In the case of Sample D, the blend comprised about 30 wt.% of polyethylene powder, having an average particle size of between about 100–300 microns, a melt flow index of about 8.0, and a weight average molecular weight of about 400,000 ($M_w$); about 42 wt.% of polymethylmethacrylate thermoplastic having an average particle size of about 400 microns and about 28 wt.% of dicyclohexylphthalate solvent extractable plasticizer.

Both Samples C and D were pre-blended and hot roll milled as in EXAMPLE 1, under the same process conditions except that the rolls wee maintained at about 110°C. Sheets about 0.040 inches thick for both Samples were cut from the rolls and each placed into stainless steel molding frames about 6 × 6 × 0.030 inch.

Sample C and D sheets were then heat-pressed at 150°C and 600 psi. for about 5 minutes in a molding press and then cooled under pressure before being removed. The Sample C and Sample D sheets were then placed in separate extracting baths, as in EXAMPLE 1, under the same process conditions.

The sample D sheet had good integrity but was translucent and when examined under a 150X power microscope showed no signs of fibrillated polyethylene. Sample C had good integrity and flexibility and was substantially non-wettable, about 40% porous, and about 60% fibrillated. Sample D was very glossy and smooth and looked very much like a thermoplastic film extruded by a melt extrusion process. There had apparently been extensive melting in the Sample D sheet. The Sample D sheet was quite hydrophobic as determined by the non-wetting of water drops placed on the surface.

Samples C and D were tested for air permeability by the method used in EXAMPLE 1 and Sample C was then heatpressed as in EXAMPLE 1. The results were as follows:

| Sample | Thickness before-after compression (mils) | mils | Air Permeability before-after compression (cu.cm./min.) | (cu.cm./min.) |
| --- | --- | --- | --- | --- |
| C (Teflon) | 16 | — | 210 | 42 |
| D (low mol. wt. polyethylene) | 35 | — | 5 | — |

The net loss of air permeability for the extruded, highly fibrillated Teflon membrane was approximately 80% due to compression. The conventional polyethylene resins are not fibrillated by the process we used, and will not produce a porous membrane possessing both the high air permeability and hydrophobicity required in an efficient air electrode. Comparison with the membrane mat of EXAMPLE 1 shows the superior air permeability of the mats of this invention both before and after pressing.

EXAMPLE 3

Two mats, Sample E and Sample F, comprising high molecular weight polyethylene were made, bonded to the active layer of a gas diffusion electrode to form an air permeable hydrophobic composite, and tested.

Sample E

A mixture of 21 grams (8.4 wt.%) of very high molecular weight polyethylene powder, having an average particle size of between about 100–300 microns, a crystalline melting point of 130°–131°C, a water absorption factor of 0.03%, a density at 20°C of 0.940–0.942 gm./cu. cm., a weight average molecular weight of about 2,000,000 and a melt flow index of nil i.e., about 0.01 gr./10 min. (Hi-Fax 1901); 128 grams (51 wt.%) of polymethylmethacrylate beads, having an average particle size of about 400 microns; and 85 grams (34 wt.%) of dicyclohexylphthalate plasticizer; was placed in a Patterson-Kelly twin shell dry blender for 45 minutes at room temperature.

This mixture was then added to a Farrel two-roll mill (6 inch dia. rolls by 13 inches long, about 0.04 inch apart maintained at a temperature of 135°C). The mixture was milled for 2 minutes to obtain a viscous batch on the rolls, then 15 grams (6 wt.% of the total blend) of separated, fibrous polypropylene filler, 0.25 inch long floc; 2.8 grams (0.6 wt.%) of polytetrafluoroethylene particles, about 0.05 microns particle size in 60% solids aqueous dispersion, was added to the batch and the milling was continued for 6 minutes at a roll speed of about 35 ft./min., to flash off the water and form a viscous, rubbery blend.

Sample F

A mixture of 21.5 grams (4.3 wt.%) of very high molecular weight polyethylene flake, having an average particle size of between about 100–300 microns, a crystalline melting point of 130°–131°C, a water absorption factor of 0.03%, a density at 20°C of 0.940–0.942 gm./cu. cm., a weight average molecular weight of about 2,000,000 and a melt flow index of nil, i.e., about 0.01 gr./10 min. (Hi-Fax 1901); 255 grams (51 wt.%) of polymethylmethacrylate beads, having an average particle size of about 400 microns, 170 grams (34 wt.%) of dicyclohexylphthalate plasticizer; was placed in a Patterson-Kelley twin shell dry blender for 45 minutes at room temperature.

This mixture was then added to a Farrel two-roll mill (6 inches dia. rolls by 13 inches long about 0.04 inch apart maintained at a temperature of 135°C). The mixture was milled for 2 minutes to obtain a viscous batch on the rolls, then 30 grams (6 wt.%) of separated, fibrous polypropylene filler, 0.25 inch long floc; 6.7 grams (1.4 wt.%) of polytetrafluoroethylene particles, about 0.05 microns particle size in 60% solids aqueous dispersion; and 16.5 grams (3.3 wt.%) of a copolymer of hexafluoropropylene and tetrafluoroethylene particles in 55% solids aqueous dispersion (sold by DuPont under the Tradename Teflon 120 FEP Emulsion) was added to the batch and the milling was continued for 6 minutes at a roll speed of about 35 ft./min., to flash off the water and form a viscous, rubbery blend.

In both Samples, the batch was cut from the rolls, in sheet form, rotated 90° and fed back into the nip between the hot rolls for 4 2-minute periods at 135°C and then cut from the rolls in the form of a flexible sheet about 0.04 inches thick. The use of plasticizer in Sample E and Sample F modifies the properties of the blend to allow use of lower hot roll temperatures, than that used in EXAMPLE 1, while providing sufficient shear forces and fibrillation, and results in a more flexible sheet and a method easily adapted to a continuous process.

The Sample E and Sample F sheets were then cooled and separately placed into stainless steel molding frames about 15 × 18 × 0.050 inch. Sample E and Sample F were then heat pressed at 150°C and 600 psi, for about 3 minutes in a molding press and then cooled under pressure before being removed.

The Sample E and Sample F sheets were placed between bronze screens and immersed in acetone for about 16 hours to extract the solvent extractable polymethylmethacrylate and plasticizer from the sheets. The sheets were then immersed in a fresh stirred acetone bath for two periods lasting 2 hours and 1 hour, removed, rinsed in deionized water and blotted dry.

The Samples both had good integrity and flexibility and were both in substantially non-wettable mat form. Under 150X magnification they were seen to comprise unmelted interlocked thin strands and irregular shaped particles and larger interlocking supporting fibers. Porosity for both samples was between about 25–50% and the pore size was about 20 microns in diameter between the fibers and particles. Both Samples appeared to have a ratio of about two strands to eight particles (about 20% fibrillation).

Samples E and F were tested for air permeability by the method used in EXAMPLE 1. The results were as follows:

| Sample (extruded) | Thickness (mils) | Air Permeability (cu. cm./min.) |
| --- | --- | --- |
| E | 18 | 425 |
| F | 11 | 350 |

The sample E and F mats were then cut 3.25 × 3.75 inches and heat and pressure bonded to separate gas diffusion electrodes by placing the cut mat on the gas entrance side of the 3.25 × 3.75 inches electrode and passing the mat and electrode through heated laminating rolls at 190°C and 300 lb./lineal inch pressure. After bonding, the mat barrier layer was examined. The fibers and particles in the mat were pressed rather than melted together and there appeared to be no melt flow, the structure maintaining its porosity and resiliency. A very good bond was produced between the catalytic electrode and the mat barrier layer in the finished composite.

The catalytic electrode material comprised about 70–80 wt.% carbon particles, 20–30 wt.% of finely divided polytetrafluoroethylene binder and about 0.1–10 milligrams of catalyst per sq. cm. of geometric electrode area. This material was wet pasted into the interstices of a fibrous, 75–95% porous, diffusion bonded, 0.02 inch thick, nickel plated, steel wool matrix, which acted as the support for the catalyzed active gas layer and as the electrical conductor. This electrical conductor matrix comprises smooth fibers bonded by an interdiffusion of atoms across fiber interfaces rather than fibers bonded by melting, and is unique in providing large pore volumes free of metallic protrusions and melt globules. It also provides a unique gas diffusion electrode structure allowing intimate contact of electrolyte, catalyst, and gas within the electrical conductor, and a very short diffusion path for the gas.

Electrodes having the barrier layers of Sample E and Sample F mat were tested in the "driven" cell shown in FIG. 4 of the drawings, containing 27 wt.% KOH solution as electrolyte. They were operated in air at 50 mA/sq. cm. current density, and at 25°C the Sample E electrode gave an initial voltage of −0.075 volts and the Sample F electrode gave an initial voltage of −0.108 volts, as measured against an Hg/HgO reference electrode. Operation at 150 mA/sq. cm. gave a polarized voltage of −0.171 volts for the Sample E electrode and a polarized voltage of −0.255 volts for the Sample F electrode. The Sample E electrode operated for 13 days and the Sample F electrode operated for 17 days in the test cell with no appreciable "sweating" of the electrolyte through the hydrophobic membrane mat, thus showing the high degree of hydrophobicity of the composites containing the barrier layers of this invention.

EXAMPLE 4

A 100% polyolefin mat, Sample G, comprising very high molecular weight polyethylene was made by the following procedure. A mixture of 90 grams (31 wt.%) of very high molecular weight polyethylene powder, having an average particle size of between about 100–300 microns, a weight average molecular weight of about 2,000,000, and a melt flow index of about 0.01 gm./10 min. (Hi-Fax 1901); 120 grams (41.5 wt.%) of polymethylmethacrylate beads, having an average particle size of about 400 microns and 80 grams (27.5 wt.% of the total blend) of dicyclohexylphthalate plasticizer was used. This mixture was placed in a blender and mixed and then hot roll milled as in EXAMPLE 3, using the same process conditions, except that no filler fibers or fluorocarbon dispersion was used in the blend. The blend was then ground in a hammer mill and extruded as in EXAMPLE 1, using the same process conditions. It was then hot roll sized at 135°C into a layer about 0.04 inch thick. The sized layer was cut from the roll as a sheet and placed into a stainless steel molding frame about 6 × 6 × 0.030 inch.

This sheet was heat and pressure molded and immersed in an acetone bath as in EXAMPLE 3, using the same process conditions, to provide a non-wettable mat. The mat had very good integrity and fair flexibility, and under 150X magnification seemed to comprise interlocked strands and irregular shaped particles. Porosity was between about 30–50% and the pore size was about 40–60 microns. This mat appeared to have a ratio of about four strands to six particles (about 40% fibrillation). A higher degree of fibrillation could easily be achieved by repeated extrusion although adding to production costs. The mat was tested for air permeability by the method of EXAMPLE 1. The results were as follows:

| Sample (extruded) | Thickness before-after compression (mils) | | Air-Permeability before-after compression (cu.cm./min.) | |
| --- | --- | --- | --- | --- |
| G | 39 | — | 920 | — |

Drops of water were then placed on the mat and the water did not seep through although with the high pore size and air permeability this membrane will be less hydrophobic than those tested in EXAMPLE 3.

We claim:

1. A non-wettable, air permeable, resilient, bondable, low melt flow hydrophobic mat, said mat being capable of bonding without melt flow while retaining hydrophobic and air permeability properties, the mat having a heat and compression resistant structure comprising about 15 to about 85 percent of unmelted, pressed, interlocked, fibrillated strands, about 0.5–4000 microns long, and about 15 to about 85 percent of unmelted irregular shaped particles, about 0.05–400 microns in diameter, both the strands and particles consisting of very high molecular weight polyethylene having a weight average molecular weight between 1,750,000 and about 5,000,000 and a melt flow index of up to about 0.02; said resilient mat having an open strand matrix containing the irregular shaped particles.

2. The hydrophobic mat of claim 1 comprising 35 to 85 percent fibrillated very high molecular weight polyethylene strands, wherein the fibrillated strands are between about 0.005 to 40 microns in diameter, and an amount of uniformly distributed thermoplastic reinforcement fibers 0.01–2 inches long effective to reinforce the mat, said thermoplastic fibers selected from the group consisting of fluorocarbon, polyamide, polyester, polypropylene and polyethylene; said mat being capable of resisting melt flow.

3. The hydrophobic mat of claim 2 wherein the mat is about 20 to 50 percent porous and has a pore size between the fibrillated polyethylene strands and the polyethylene particles of about 0.003–100 microns in diameter.

4. A non-wettable, air permeable, resilient, bondable, low melt flow hydrophobic mat, capable of retaining hydrophobic and air permeability properties after heat and pressure bonding to a gas diffusion electrode body, said mat being capable of bonding without melt flow, the mat having a heat and compression resistant structure consisting essentially of about 15 to about 85 percent of unmelted, pressed, interlocked, fibrillated strands, about 0.5–4000 microns long, of very high molecular weight polyethylene having a weight average molecular weight between 1,750,000 and about 5,000,000 and a melt flow index of up to about 0.02, and about 15 to about 85 percent of unmelted irregular shaped particles, about 0.05–400 microns in diameter, of very high molecular weight polyethylene having a weight average molecular weight between 1,750,000 and about 5,000,000 and a melt flow index of up to about 0.02; said resilient mat having an open strand matrix containing the irregular shaped particles; the mat being about 20 to about 50 percent porous and capable of resisting melt flow under heat and pressure.

5. The hydrophobic mat of claim 4, wherein the pore size between the fibrillated polyethylene strand and the polyethylene particles is about 0.003–100 microns in diameter, the fibrillated strands are between about 0.005 to 40 microns in diameter, the mat also containing an amount of uniformly distributed thermoplastic reinforcement fibers 0.01–2 inches long effective to reinforce the mat, said thermoplastic fibers selected from the group consisting of fluorocarbon, polyamide, polyester, polypropylene and polyethylene.

* * * * *